US010436160B2

(12) United States Patent
Itagaki

(10) Patent No.: US 10,436,160 B2
(45) Date of Patent: Oct. 8, 2019

(54) ENGINE INTAKE STRUCTURE FOR VEHICLE

(71) Applicant: HONDA MOTOR CO., LTD., Tokyo (JP)

(72) Inventor: Keisuke Itagaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/985,066

(22) Filed: May 21, 2018

(65) Prior Publication Data

US 2018/0363603 A1  Dec. 20, 2018

(30) Foreign Application Priority Data

Jun. 14, 2017 (JP) ................................ 2017-116979

(51) Int. Cl.
| | | |
|---|---|---|
| F02M 35/16 | (2006.01) | |
| B60K 13/02 | (2006.01) | |
| F02M 35/10 | (2006.01) | |
| F02M 35/022 | (2006.01) | |

(52) U.S. Cl.
CPC ........... *F02M 35/161* (2013.01); *B60K 13/02* (2013.01); *F02M 35/10262* (2013.01); *F02M 35/10275* (2013.01); *F02M 35/022* (2013.01)

(58) Field of Classification Search
CPC ........... F02M 35/161; F02M 35/10275; F02M 35/10262; F02M 35/022; B60K 13/02
See application file for complete search history.

(56) References Cited

U.S. PATENT DOCUMENTS

| | | | | |
|---|---|---|---|---|
| 5,660,243 A | * | 8/1997 | Anzalone | B60K 13/02 180/68.1 |
| 6,880,655 B2 | * | 4/2005 | Suwa | B60K 11/08 180/68.1 |
| 7,069,893 B2 | * | 7/2006 | Cusumano | F02M 35/022 123/184.21 |
| 7,234,555 B2 | * | 6/2007 | Khouw | B60K 13/02 180/68.3 |
| 8,100,209 B2 | * | 1/2012 | Goldsberry | B60K 13/02 180/68.1 |
| 8,127,878 B2 | * | 3/2012 | Teraguchi | B60K 11/08 180/68.1 |

(Continued)

FOREIGN PATENT DOCUMENTS

| | | |
|---|---|---|
| JP | 2006-193122 A | 7/2006 |
| JP | 2008-296853 A | 12/2008 |

(Continued)

OTHER PUBLICATIONS

Office Action issued in Japanese Patent Application No. 2017-116979, dated Aug. 21, 2018.

*Primary Examiner* — Jacob B Meyer
(74) *Attorney, Agent, or Firm* — Armstrong Teasdale LLP

(57) ABSTRACT

An engine intake structure for an internal combustion engine (13) of a vehicle (1) comprises a vehicle body opening (6) formed in a front part of an engine room (3) of the vehicle, an intake duct member (22) defining an air inlet (22A) facing in a forward direction and an air passage extending rearward from the air inlet, the air inlet being positioned higher than the vehicle body opening, and a flow obstructing member (60) typically consisting of an auxiliary device such as a horn positioned in a straight path extending from the vehicle body opening to the air inlet.

9 Claims, 7 Drawing Sheets

(56) References Cited

U.S. PATENT DOCUMENTS

| | | | | |
|---|---|---|---|---|
| 8,157,040 B2* | 4/2012 | Khouw | ................ | B60K 13/02 |
| | | | | 180/68.3 |
| 8,201,651 B2* | 6/2012 | Salvesen | ................ | B60K 13/02 |
| | | | | 180/68.3 |
| 8,215,433 B2* | 7/2012 | Khouw | ................ | B60K 13/02 |
| | | | | 180/68.3 |
| 8,474,558 B2* | 7/2013 | Ohira | ................ | F02M 35/161 |
| | | | | 180/68.3 |
| 8,479,852 B2* | 7/2013 | Maurer | ................ | F28F 13/06 |
| | | | | 165/41 |
| 8,528,679 B2* | 9/2013 | Stuckey | ................ | B60K 13/02 |
| | | | | 180/68.3 |
| 8,540,043 B2* | 9/2013 | Mehlos | ................ | F02M 35/161 |
| | | | | 180/68.1 |
| 8,827,019 B2* | 9/2014 | Deckard | ................ | F16H 57/0416 |
| | | | | 180/68.1 |
| 9,211,791 B2* | 12/2015 | Laakso | ................ | B60K 13/02 |
| 9,669,729 B2* | 6/2017 | Ohashi | ................ | B60K 13/02 |
| 9,731,592 B2* | 8/2017 | Kunimasa | ................ | B60K 11/04 |
| 10,096,847 B2* | 10/2018 | Mito | ................ | B60K 13/02 |
| 2003/0042055 A1* | 3/2003 | Suwa | ................ | B60K 11/08 |
| | | | | 180/68.3 |
| 2003/0188902 A1* | 10/2003 | Decuir | ................ | B60K 13/02 |
| | | | | 180/68.3 |
| 2005/0230162 A1* | 10/2005 | Murayama | ................ | B60K 11/08 |
| | | | | 180/68.1 |
| 2005/0279547 A1* | 12/2005 | Udo | ................ | B60K 11/04 |
| | | | | 180/68.4 |
| 2006/0006012 A1* | 1/2006 | Khouw | ................ | B60K 13/02 |
| | | | | 180/68.3 |
| 2007/0012276 A1* | 1/2007 | Ohara | ................ | F02M 35/04 |
| | | | | 123/184.57 |
| 2010/0032220 A1* | 2/2010 | Ohira | ................ | F02M 35/10013 |
| | | | | 180/68.3 |
| 2010/0170734 A1* | 7/2010 | Teraguchi | ................ | B60K 11/08 |
| | | | | 180/68.3 |
| 2016/0207419 A1* | 7/2016 | Ohashi | ................ | B60K 13/02 |
| 2018/0363599 A1* | 12/2018 | Itagaki | ................ | F02M 35/104 |
| 2018/0363602 A1* | 12/2018 | Itagaki | ................ | F02M 35/10268 |
| 2018/0363603 A1* | 12/2018 | Itagaki | ................ | B60K 13/02 |
| 2018/0363604 A1* | 12/2018 | Miyashita | ................ | F02M 35/161 |

FOREIGN PATENT DOCUMENTS

| | | |
|---|---|---|
| JP | 2013-130186 A | 7/2013 |
| JP | 2015-116888 A | 6/2015 |

* cited by examiner

ENGINE INTAKE STRUCTURE FOR VEHICLE

TECHNICAL FIELD

The present invention relates to an engine intake structure for an internal combustion engine of a vehicle.

BACKGROUND ART

In a known engine intake structure for a vehicle, an air inlet of an intake duct is defined by a depending wall depending from an upper wall of the intake duct and slanted rearward and an upright wall extending from a lower wall of the intake duct to be located behind the depending wall, such that the air inlet opens downward. See JP2013-130186A. In such an intake structure, the air introduced into the engine room of the vehicle through an upper grill passes through the air inlet as an upwardly directed flow along the depending wall. Therefore, moisture and other relatively heavy foreign matters that may be contained in the intake air are prevented from being introduced into the air duct.

According to this prior art, because the intake air is required to make sharp turns when flowing in the air inlet of the intake duct, flow resistance to the intake air is significant. Therefore, the intake inlet and other parts of the intake duct are required to have a large cross sectional area.

SUMMARY OF THE INVENTION

In view of such a problem of the prior art, a primary object of the present invention is to provide an engine intake structure for a vehicle that can remove foreign matters from the intake air without sharply bending the flow path of the intake air and thereby eliminate need to unduly increase the cross sectional area of the air inlet and other parts of the intake duct.

To achieve such an object, the present invention provides an engine intake structure for an internal combustion engine (13) of a vehicle (1), comprising: a vehicle body opening (6) formed in a front part of an engine room (3) of the vehicle; an intake duct member (22) defining an air inlet (22A) facing in a forward direction and an air passage extending rearward from the air inlet, the air inlet being positioned higher than the vehicle body opening; and a flow obstructing member (60) positioned in a straight path extending from the vehicle body opening to the air inlet.

Because the air inlet is positioned higher than the vehicle body opening, the air flow from the vehicle body opening to the air inlet follows an upwardly slanted path. As a result, moisture and other relatively heavy foreign matters that may be contained in the intake air are separated from the air flow and prevented from being introduced into the air inlet. Owing to the presence of the flow obstructing member, the flow path of the intake air is bent before being introduced into the air inlet. This also contributes to the separation of foreign matters from the air flow before the air flow reaches the air inlet, and hence, the prevention of introduction of foreign matters into the intake duct member. Because the intake duct member defines the air inlet to face in the forward direction and the air passage to extend rearward from the air inlet, the flow path of the intake air is not sharply bent (particularly at a position immediately upstream of the air inlet), and thus, the flow resistance to the intake air is minimized without unduly increasing the cross sectional area of the air inlet and other parts of the intake duct. The air inlet may be positioned higher than the vehicle body opening to such an extent that no overlap exists between the air inlet and the vehicle body opening. Alternatively, the air inlet may be positioned higher than the vehicle body opening to such an extent that the centroid of the air inlet is substantially higher than the centroid of the vehicle body opening.

The flow obstructing member may comprise an auxiliary device of the vehicle.

Thereby, no extra member is required to be added as the flow obstructing member so that no additional cost is required.

The auxiliary device may comprise a horn.

Since the horn is located in a front part of the vehicle so as not to be obstructed toward the front, the sound emitted from the horn can be transmitted in the forward direction in an efficient manner.

The engine intake structure may further comprise a radiator (11) provided in a front part of the engine room, and a cover member (10) covering an upper part of a space (12) defined between the vehicle body opening and the radiator, wherein the cover member is formed with a downward recess (50) which is open in a rear end thereof and has an opening (50E) passed through the cover member in a front end thereof, and the intake duct member is at least partly received in the recess.

The cover member controls the air flow in the engine room, and improves the external appearance of the engine room. The air introduced into the engine room via the vehicle body opening is passed into the recess substantially solely via the opening, and is then introduced into the air inlet of the intake duct member. Thereby, the heated air that may be present above the cover member is prevented from being drawn into the air inlet. Also, this structure allows the intake duct member to be prevented from excessively protruding above the cover member.

According to preferred embodiment of the present invention, the recess is provided with a bottom wall (50A) and a front wall (50B), and the air inlet is spaced rearward from the front wall, and the opening comprises a plurality of slots (51) formed in the front wall and a front part of the bottom wall.

Since the opening is formed by a plurality of slots, relatively large foreign matters can be prevented from entering the air inlet. Since the air inlet is spaced rearward from the front wall, the opening may extend in both the front wall and a front part of the bottom wall so that a large opening area may be ensured to the opening.

Preferably, each slot extends vertically in the front wall, and continuously extends to the front part of the bottom wall.

Thereby, the opening having a desirable configuration can be formed economically and without impairing the mechanical strength and the stiffness of the cover member.

The intake duct member may be provided with a flange (37) extending laterally beyond an outer periphery of the recess and closely overlying the cover member.

Thereby, the hot air in the engine room is prevented from being drawn into the intake duct member.

According to a preferred embodiment of the present invention, the engine intake structure further comprises an upper flow guide plate (58) extending substantially horizontally in the space defined between the vehicle body opening and the radiator in an overlapping relationship with the flow obstructing member in side view.

The upper flow guide plate distributes the air flow introduced from the vehicle body opening to the air inlet via the opening and the radiator in cooperation with the flow obstructing member in a favorable manner.

According to a preferred embodiment of the present invention, the engine intake structure further comprises a lower flow guide plate (59) extending substantially horizontally under the upper flow guide plate in a spaced apart relationship, and an active grill shutter (56) provided to oppose a front side of the radiator, wherein the active grill shutter includes a frame member (57) extending along an outer periphery of the active grill shutter, and the upper flow guide plate and the lower flow guide plate are supported by an upper lateral member and a lower lateral member of the frame member, respectively.

Thereby, the cooling air supplied to the radiator can be controlled in an advantageous manner.

In a preferred embodiment, the recess is formed in a part of the cover member which is laterally offset relative to a lateral center of the radiator, and the engine intake structure further comprises a partition wall (66B) extending vertically and in a fore and aft direction, and located in front of the recess in an offset relationship to a lateral center of the opening in an inboard direction.

The partition wall prevents heated air in the engine room from being drawn into the air inlet.

BRIEF DESCRIPTION OF THE DRAWING(S)

DESCRIPTION OF THE PREFERRED EMBODIMENT(S)

A preferred embodiment of the present invention is described in the following with reference to the appended drawings.

Figure 1:
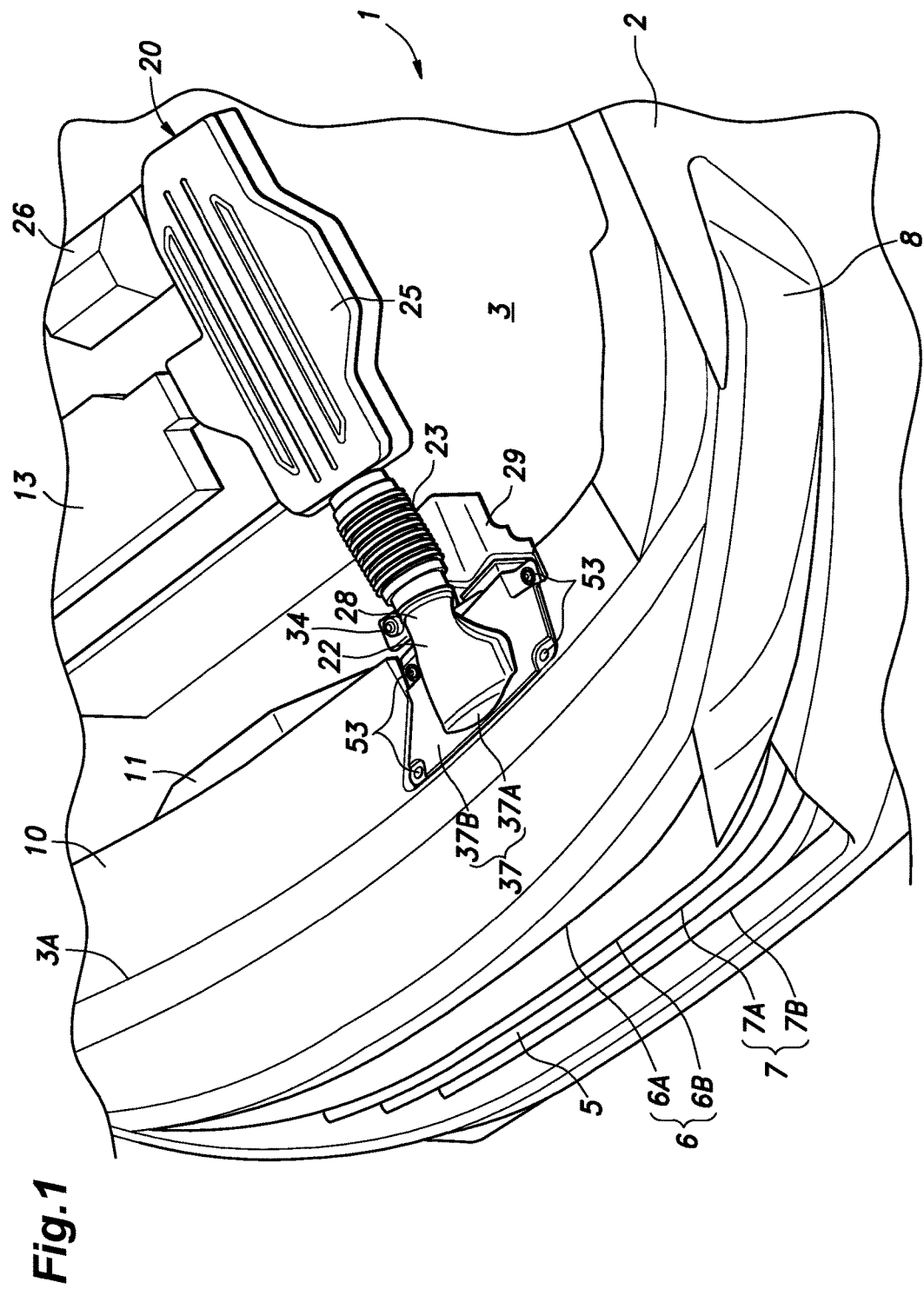
FIG. 1 is a perspective view of a front part of a motor vehicle according to an embodiment of the present invention.

FIG. 1 shows a front part of a motor vehicle 1 according to an embodiment of the present invention. An engine room 3 is defined in a front part of a vehicle body 2. An engine hood 4 (FIG. 4) covers the engine hood 4 from above. The engine hood 4 and other devices not relevant to the present invention are omitted from illustration in FIG. 1.

Figure 4:
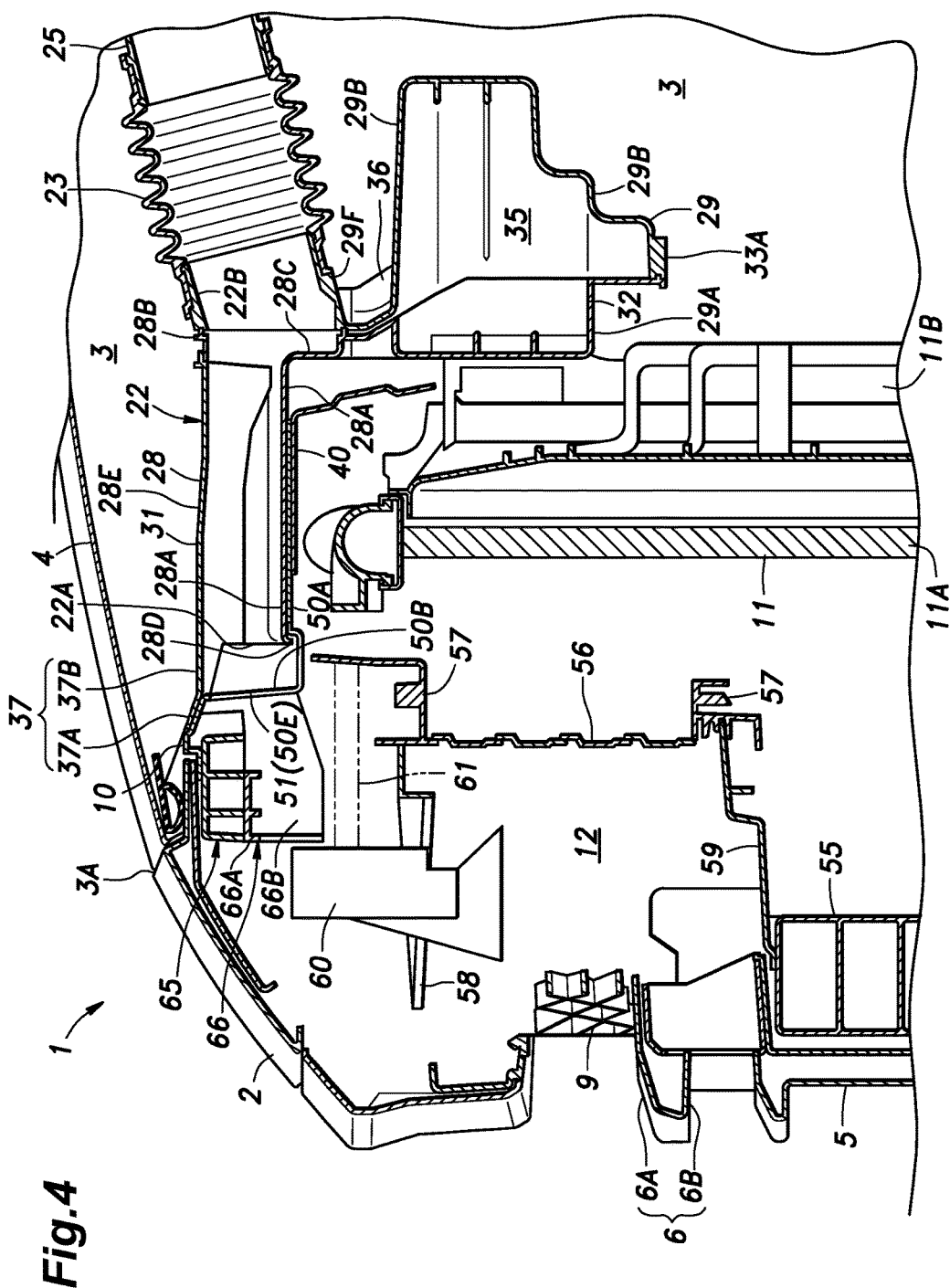
FIG. 4 is a sectional view taken along line IV-IV of FIG. 3.

A front bumper 5 extends laterally at the front end of the vehicle body 2. An upper vehicle body opening 6 is defined above the upper edge of the front bumper 5, and a lower vehicle body opening 7 is defined below the lower edge of the front bumper 5. A pair of front lights 8 are provided on either lateral end of the front end of the vehicle body 2. The upper vehicle body opening 6 includes an upper opening 6A and a lower opening 6B which are located one above the other laterally between the two front lights 8. The upper opening 6A is fitted with a front upper grill 9 (FIG. 4). The lower vehicle body opening 7 also includes an upper opening 7A and a lower opening 7B which extend laterally and are located one above the other.

A front bulkhead having a frame structure is provided in a part of the engine room 3 at a certain distance from the part of the vehicle body 2 defining the upper and lower vehicle body front openings 6 and 7, and an engine radiator 11 is supported by the front bulkhead. A cover member 10 made of a plastic sheet member extends from the upper end of the bulkhead to the opposing front end part of the vehicle body 2 so as to cover an upper part of a space 12 defined between the front bulkhead and the opposing front end part of the vehicle body 2 (or between the upper vehicle body opening 6 and the radiator 11). The cover member 10 thus extends substantially horizontally under the engine hood 4.

A rear part of the engine room 3 accommodates an internal combustion engine 13 having a laterally extending crankshaft. The engine 13 is provided with an intake system 20 which includes an upstream side duct module 22 having an air inlet 22A (FIG. 4) and incorporated with an upstream resonator, a bellows pipe 23 having an upstream end connected to the rear end (downstream end) of the upstream side duct module 22, and a downstream side duct module 25 having an upstream end connected to the rear end (downstream end) of the bellows pipe 23 and incorporated with a downstream resonator.

The upstream side duct module 22 is attached to a part of the cover member 10 located on the left hand side thereof. The downstream side duct module 25 is elongated in the fore and aft direction, and has a small vertical dimension as compared to the width thereof. The downstream side duct module 25 extends in the fore and aft direction along the left side of the engine 13, and is connected to an air cleaner 26 located behind the engine 13. The downstream end of the air cleaner 26 is connected to an intake manifold of the engine 13 not shown in the drawings.

Figure 2:
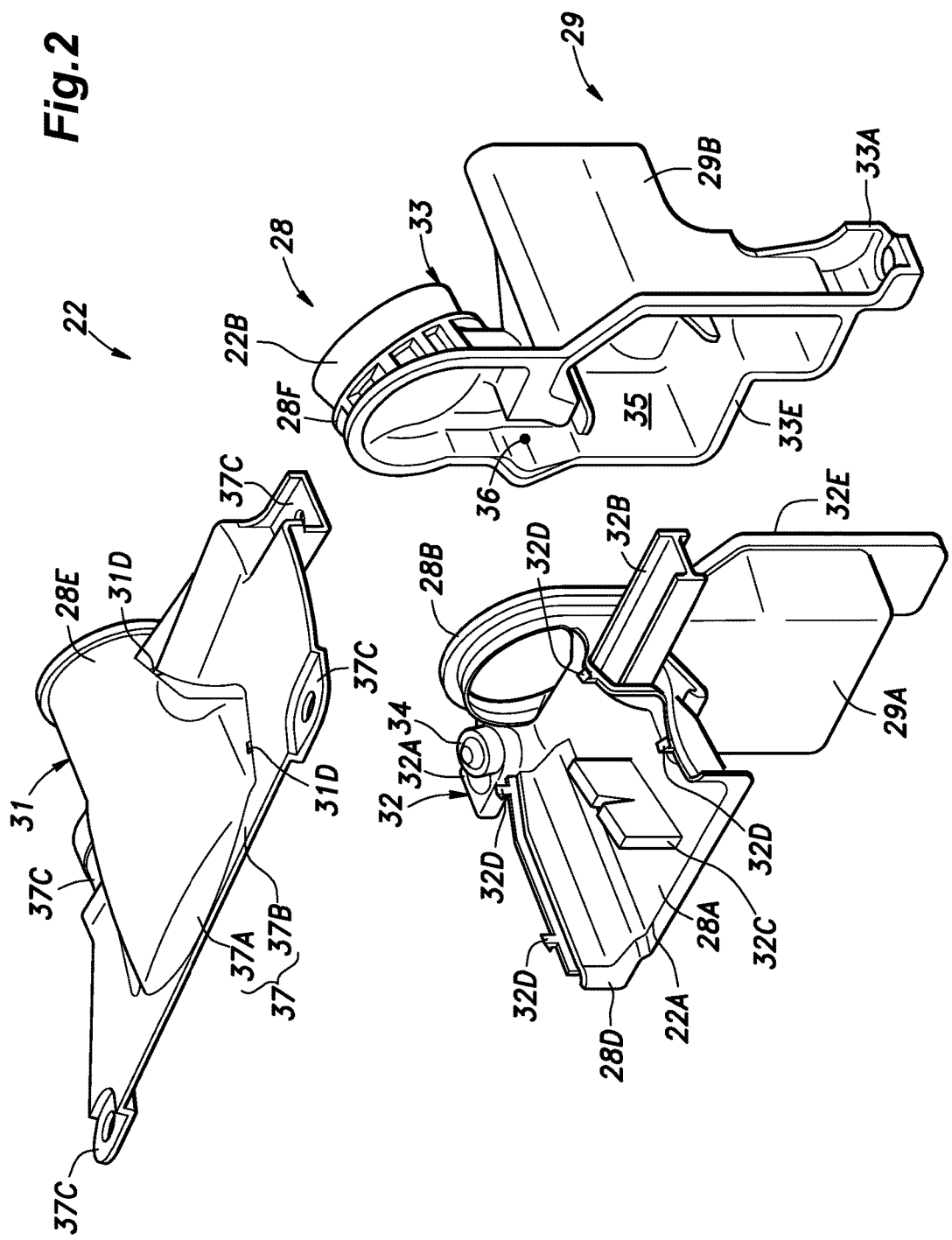
FIG. 2 is an exploded perspective view of an upstream side duct module shown in FIG. 1.

FIG. 2 shows an exploded perspective view of the upstream side duct module 22. The upstream side duct module 22 consists of a passage portion 28 defining an intake passage (air passage) extending in the fore and aft direction, and a resonator portion 29 (upstream resonator) depending from a rear part of the passage portion 28. The upstream side duct module 22 is made of three pieces (first to third pieces) 31-33 each consisting of molded plastic member. The second and third pieces 32 and 33 are joined to each other in the fore and aft direction, and the first piece is joined to an upper end of the second piece 32.

The second piece 32 includes a first annular portion 28B having a central axial line directed in the fore and aft direction, a lower half 28A extending forward from a lower half part of the first annular portion 28B, and a front half 29A depending from the first annular portion 28B and forming a front wall of the resonator portion 29. The first annular portion 28B internally defines a substantially circular opening. The lower half 28A is provided with a laterally elongated trough shape, and the left side of the lower half 28A laterally spreads out toward the front end thereof so that the lower half 28A is formed as a lower flared part 28D or a funnel shaped portion. The lower half 28A is connected to the lower edge of the first annular portion 28B via a connecting vertical wall 28C (FIG. 4) so that the bottom surface (upper surface) of the lower half 28A is located higher than the lower end of the inner opening of the first annular portion 28B.

A tongue piece 32A extends rightward from a right rear end part of the lower half 28A, and is provided with an opening for securing the upstream side duct module 22 to the vehicle body 2 by using a fastener. A beam member 32B having an H-shaped cross section extends leftward from a left rear end part of the lower half 28A. An upright support wall 32C (FIG. 4) projects upward from the bottom surface of the lower half 28A, and extends in the fore and aft direction. Two pairs of engagement claws 32D projects upward from the upper ends of the side walls of the lower half 28A.

The front half 29A bulges forward, and has an outer profile which is continuously connected to the outer profile of the first annular portion 28B so as to jointly define a flush mating surface 32E facing rearward.

The first piece 31 comprises an upper half 28E of a semi-cylindrical configuration opposing the lower half 28A and is configured to form the passage portion 28 in cooperation with the lower half 28A, and a flange 37 extending laterally from the lower edge of the upper half 28E. The upper half 28E diverges forward in conformity with the lower half 28A so as to jointly form the passage portion 28 that slightly flares laterally toward the front part thereof. The flange 37 extends laterally from either side of the lower half 28A and extends forward beyond the front edge of the lower half 28A.

The third piece 33 comprises a second annular portion 28F having an inner opening defining the inner periphery of the passage portion 28, and a rear half 29B depending from the second annular portion 28F and having a rearwardly recessed configuration so as to form the resonator portion 29 jointly with the front half 29A. A lower end part of the rear half 29B is integrally provided with a mounting leg 33A having a hole for passing through a fastening member (not shown in the drawings). The rear end of the second annular portion 28F is provided with a tubular connecting portion 22B extending rearward and upward to be connected to the front end of the bellows pipe 23. The periphery of the second annular portion 28F and the periphery of the rear half 29B jointly form an annular flush mating surface 33E configured to conformally abut against the mating surface 32E of the second piece 32.

The second piece 32 and the third piece 33 are each made of a relatively hard molded plastic member (such as PP), and may be joined to each other by vibration welding, for instance. The resonator portion 29 internally defines a resonator chamber 35 which communicates with the intake passage defined by the passage portion 28 via a narrowed neck portion 36.

The first piece 31 is made of relatively soft plastic material (such as thermoplastic resin). The rear end of the upper half 28E abuts the upper half of the first annular portion 28B, and the lower ends of the side walls of the upper half 28E abut the upper ends of the respective side walls of the lower half 28A of the second piece 32. The engagement claws 32D of the upper ends of the side walls of the lower half 28A are engaged by corresponding engagement holes 31D formed in the boundary between the upper half 28E and the flange 37. The first piece 31 and the second piece 32 thus jointly define the air inlet 22A and a front end (upstream end) part of the intake passage. The front part of the upper half 28E is spaced from the upper end of the support wall 32C so that the upper half 28E can deflect downward to a certain extent when pressed downward, but is prevented from excessively collapsing. The left side of the flange 37 which is laterally more elongated than the right side of the flange 37 is supported by the beam member 32B from below. The first piece 31 is attached to the second piece 32, but is not directly attached to the third piece.

The passage portion 28 of the upstream side duct module 22 defines a part of the intake passage that has a progressively increasing lateral dimension toward the upstream end thereof while the vertical dimension is substantially constant over the entire length thereof (slightly diminishing vertical height toward the upstream end thereof). At any event, the cross sectional area of the intake passage defined by the passage portion 28 progressively increases toward the upstream end thereof.

Figure 3:
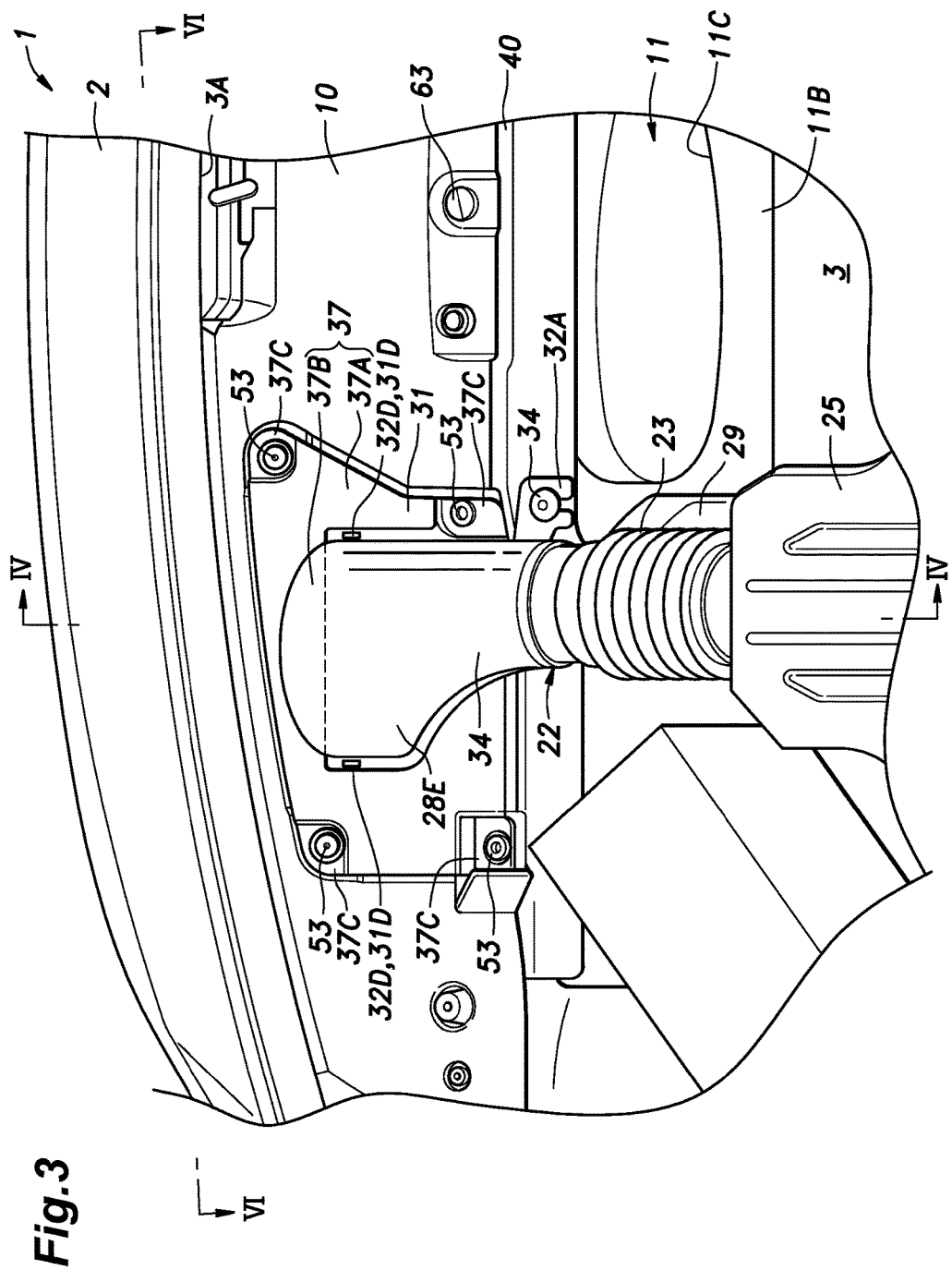
FIG. 3 is a fragmentary plan view of the front part of the motor vehicle shown in FIG. 1.

FIG. 3 is a plan view of a front part of the vehicle shown in FIG. 1, and FIG. 4 is a sectional view taken along line IV-IV of FIG. 2. As shown in FIGS. 3 and 4, under a rear edge part of the cover member 10 is positioned an upper cross member 40 of the front bulkhead. The upper cross member 40 extends laterally, and is made of a sheet metal strip, an angle member, a channel member or a combination of such members. In the illustrated embodiment, the upper cross member 40 is formed with a pair of sheet metal strips which are laid onto one another so as to define an L-shaped cross section by including a horizontal upper wall and a rear wall depending from the rear edge of the upper wall.

The radiator 11 includes a radiator core 11A received in the front bulkhead, a radiator fan provided on a rear side of the radiator core 11A, and a shroud 11B covering the fan from behind, and defining an air outlet 11C facing rearward. The radiator 11 is provided in a part of the engine room 3 located at a laterally central part of the vehicle body 2, and is fixedly attached to the upper cross member 40 and a lower cross member (not shown in the drawings) of the front bulkhead. The resonator portion 29 of the upstream side duct module 22 is positioned to oppose a part of the shroud 11B located to the left of the air outlet 11C.

Figure 5:
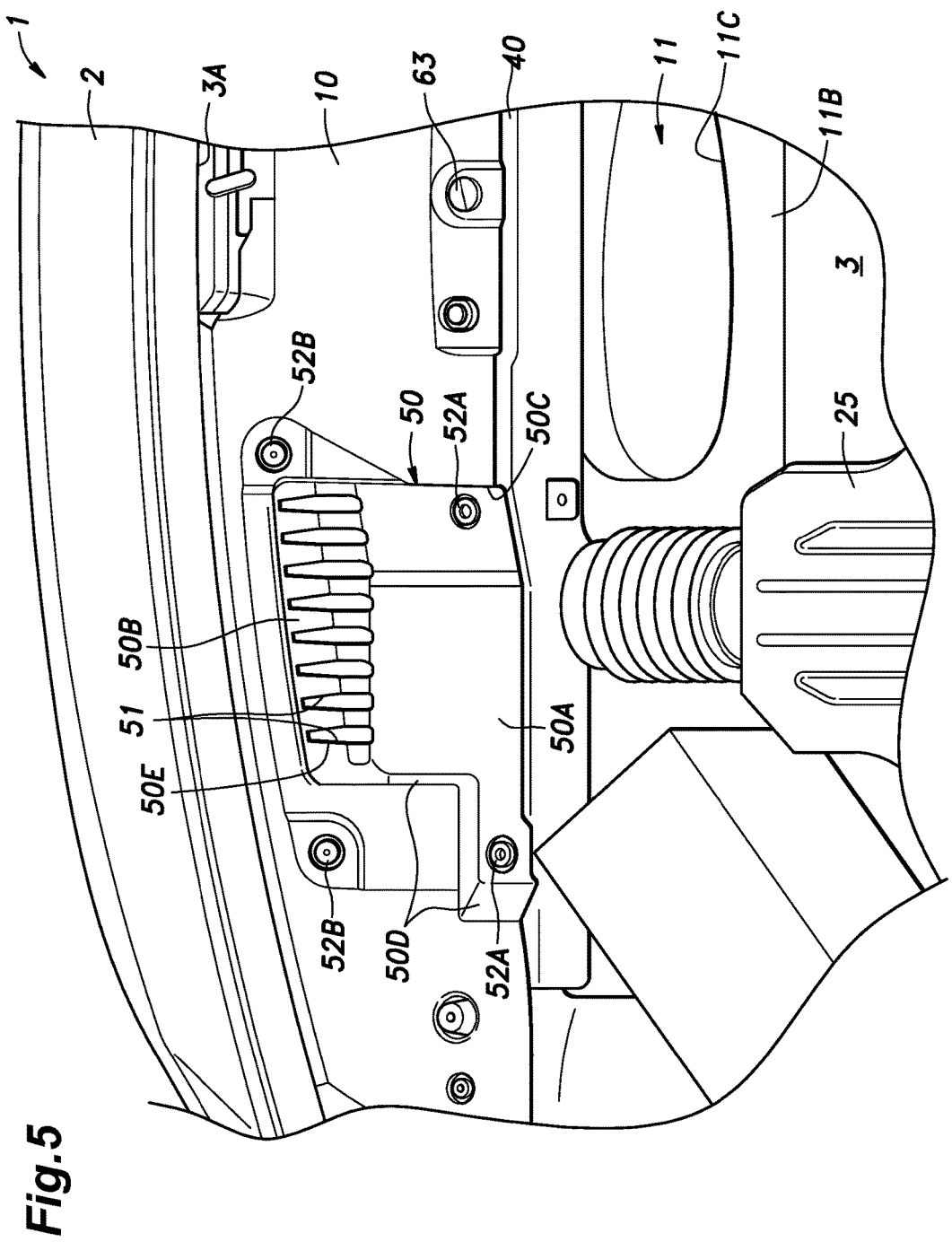
FIG. 5 is a fragmentary plan view of the front part of the motor vehicle with the upstream side duct module omitted from illustration.

FIG. 5 is a view similar to FIG. 3 with the upstream side duct module 22 omitted from illustration. As shown in FIGS. 4 and 5, a left hand side part of the cover member 10 is provided with a recess 50 which is recessed downward. The recess 50 is defined by a bottom wall 50A, a front wall 50B, a right side wall 50C and a left side wall 50D in such a manner that bottom surface of the recess 50 extends substantially horizontally in the rearward direction, and a front end part of the recess 50 is defined by a sloping surface of the front wall 50B that ascends linearly toward the front side. As shown in FIG. 4, the front end part of the bottom wall 50A of the recess 50 is lower in elevation than the remaining part of the bottom wall 50A owing to the presence of a step extending laterally in the front end part of the bottom wall 50A, and overhangs from the front edge of the upper cross member 40. The bottom wall 50A is also slanted in the lateral direction such that the right side thereof is lower than the left side thereof. The upper surface of the corresponding part of the upper cross member 40 is provided with a corresponding slant conforming to the lateral slant of the bottom wall 50A.

The front wall 50B of the recess 50 is formed with a plurality of vertically elongated slots 51 arranged laterally at a regular interval. These slots 51 may extend to a front part of the bottom wall 50A via the step extending laterally in the front end part of the bottom wall 50A. These slots 51 form an opening 50E communicating the interior of the recess 50 (the region above the cover member 10) with a front part (space 12) of the engine room 3. The front wall 50B and the bottom wall 50A of the recess 50 have a greater lateral width than the flared front end of the upstream side duct module 22 so that the combined opening area of the slots 51 may be maximized.

A rear end part of the left side wall 50D extends further leftward than the remaining part of the left side wall 50D, and a part of the bottom wall 50A extending into this extended part of the left side wall 50D is provided with a mounting hole 52A. Another mounting hole 52A is provided in a right rear end part of the bottom wall 50A. A pair of similar mounting holes 52B are formed on either side of a front edge of the bottom wall 50A. These mounting holes 52A and 52B are used for attaching the flange 37 of the upstream side duct module 22 to the cover member 10.

As shown in FIGS. 3 to 5, the upstream side duct module 22 is attached to the cover member 10 in such a manner that the lower half 28A is received in the recess 50 and the upper half 28E projects upward from the upper contour of the cover member 10. The flange 37 includes a cover portion 37A covering the recess 50 jointly and continuously with the upper half 28E so as to define a part of the intake passage, and an overlying portion 37B extending substantially horizontally from the upper half 28E and the cover portion 37A to closely overlie the part of the upper surface of the cover member 10 surrounding the recess 50.

The overlying portion 37B of the flange 37 has a substantially rectangular outer profile, and is provided with mounting holes 37 at four corners for receiving fasteners such as clips that are passed into the mounting holes 52A and 52B of the cover member 10.

As shown in FIG. 4, in the installed state of the upstream side duct module 22, the air inlet 22A is spaced from the front wall 50B of the recess 50 by a certain distance. A lower flared part 28D formed in the front edge of the lower half 28A overhangs from the front edge of the step in the bottom wall 50A, and extends downward beyond the front edge of the step. The air inlet 22A is positioned slightly ahead of the upper cross member 40 and the radiator 11.

A bumper beam 44 extends laterally behind the front bumper 5, and has two ends that are attached to the vehicle body 2 via extensions not shown in the drawings. A active grill shutter 56 is positioned between the upper vehicle body opening 6 and the radiator 11, and is retained by a frame member 57 which is attached to the upper cross member 40 at an upper end thereof and to the lower cross member at a lower end thereof. An upper flow guide plate 58 extends substantially horizontally forward from an upper part of the frame member 57, and a lower flow guide plate 59 extends substantially horizontally forward from a lower part of the frame member 57 so as to guide the air admitted from the upper vehicle body opening 6 into the active grill shutter 56. The lateral ends of the upper flow guide plate 58 terminate at a certain right hand side position and a certain left hand side position, respectively, so as to define spaces to receive auxiliary devices such as horns 60 which are supported by the frame member 57 via respective horn brackets 61.

Figure 6:
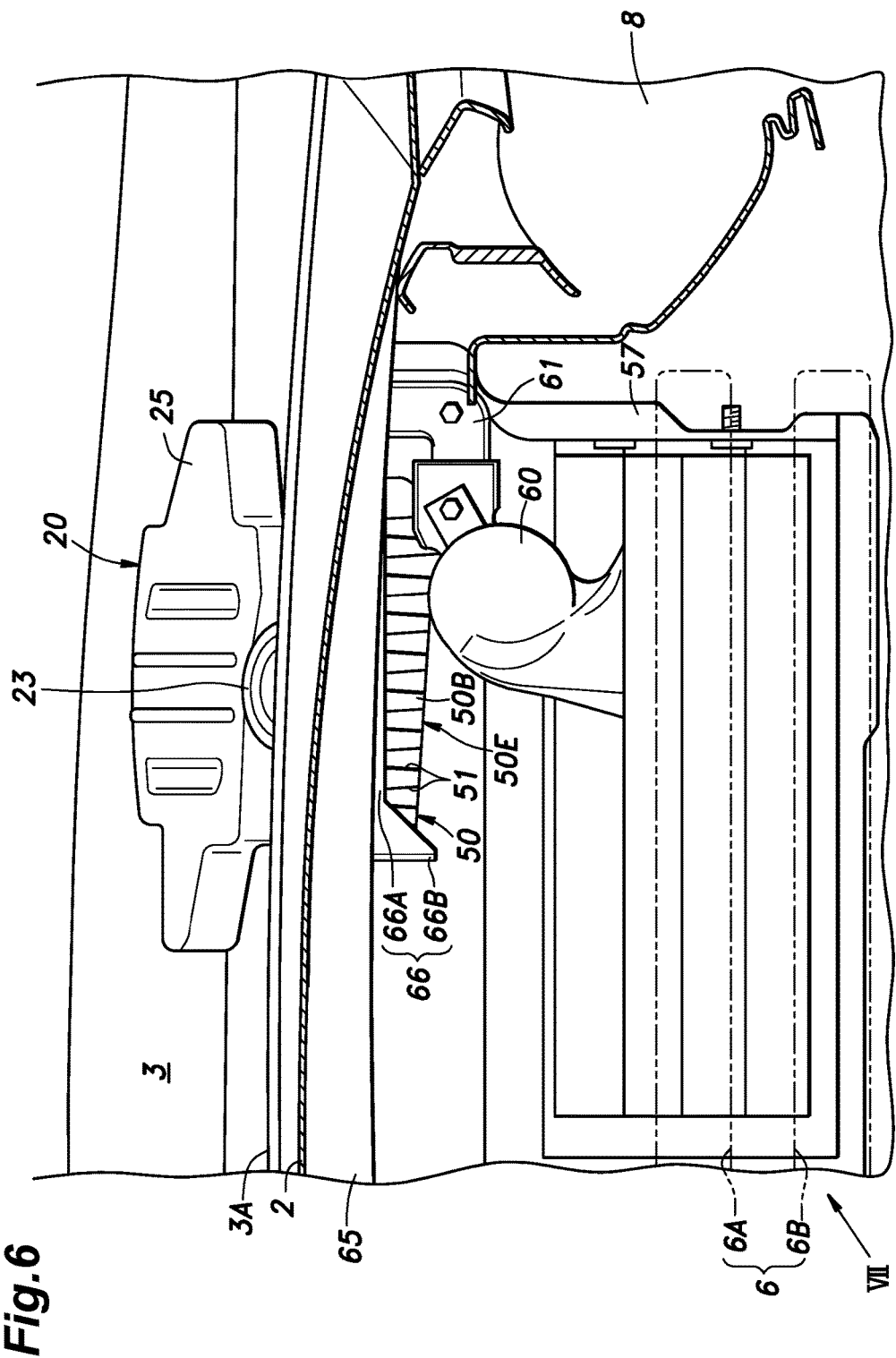
FIG. 6 is a sectional view taken along line VI-VI of FIG. 3.

FIG. 6 is a sectional view taken along line VI-VI of FIG. 3. As shown in FIGS. 4 and 6, the left horn 60 is positioned above the upper edge of the upper vehicle body opening 6, and in front of and below the lower end of the recess 50 (possibly with a slight overlap therewith). Furthermore, the left horn 60 substantially aligns with the air inlet 22A in plan view. Thereby, the left horn 60 is placed in a straight path extending from the upper vehicle body opening 6 to the air inlet 22A. Therefore, the air admitted from the upper vehicle body opening 6 flows obliquely upward toward the slots 51, and is forced to circumvent the left horn 60 along lateral sides and/or the upper and the lower ends of the left horn 60.

Figure 7:
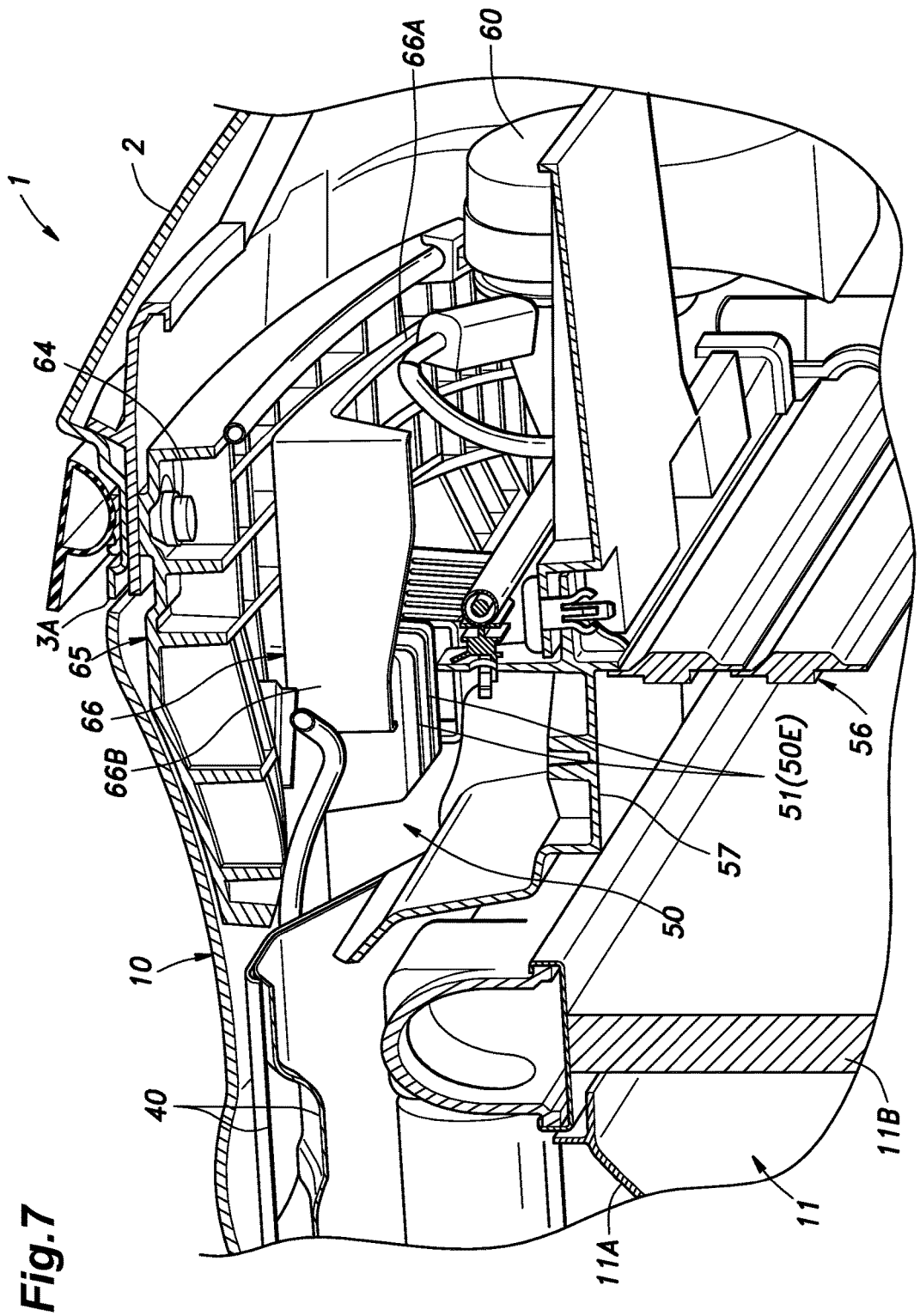
FIG. 7 is a sectional rear perspective view of a front part of an engine room as seen from the direction indicated by arrow VII in FIG. 6.

FIG. 7 is a sectional rear perspective view of a front part of an engine room as seen from the direction indicated by arrow VII in FIG. 6. As shown in FIGS. 3, 4 and 7, a rear edge part of the cover member 10 is placed on the upper surface of the upper cross member 40, and is attached to the upper cross member 40 by the fasteners 53 and 63 (FIG. 3) used for securing the upstream side duct module 22. As shown in FIGS. 4 and 7, a front edge part of the cover member 10 is placed against the lower surface of a part of the vehicle body 2 defining a front edge of the upper opening 3A of the engine room 3, and a laterally extending support member 65 is placed against the lower surface of the cover member 10, and is fixedly secured to the vehicle body 2 by using front clips (FIG. 7) passed through the support member 65 and the cover member 10 and engaged by holes provided in the part of the vehicle body 2 defining a front edge of the upper opening 3A of the engine room 3. The support member 65 is formed with grid-like ribs on the lower surface thereof for an improved stiffness, and supports the cover member 10 from below with a smooth upper surface of the support member 65.

A flow guide member 66 is attached to an underside of the support member 65 so as to be positioned ahead of the recess 50 of the cover member 10. The flow guide member 66 includes a main part 66A extending horizontally and having a planar upper surface abutting the lower surface of the support member 65 and a lower surface formed with grid-like ribs, and a partition wall 66B depending from the right edge of the main part 66A and extending in the fore and aft direction. As shown in FIGS. 4 and 6, the lower edge of the partition wall 66B is substantially at a same elevation as the lower end of the recess 50, and adjacent to the right end of the recess 50 so that the external air admitted in the engine room 3 from the upper vehicle body opening 6 is allowed to be introduced into the slots 51 while preventing air from being drawn into the slots 51 from the right side.

The intake structure of the vehicle 1 is constructed as discussed above. In the following is described the mode of operation of this intake structure.

Because the air inlet 22A is located above the upper vehicle body opening 6 as shown in FIG. 4, the air flow from the upper vehicle body opening 6 to the air inlet 22A follows an upwardly slanted path. As a result, water particles and other foreign matters that may be contained in the air admitted into the engine room 3 from the upper vehicle body opening 6 are separated from the air flow under the gravitational force before the air reaches the air inlet 22A, and prevented from being introduced into the upstream side duct module 22 (or into the intake system 20 of the engine). Because the horn 60 is placed in the straight path extending from the upper vehicle body opening 6 to the air inlet 22A and obstructs the straight air flow from the upper vehicle body opening 6 to the air inlet 22A, the air flow is caused to circumvent the horn 60, and is thereby forced along a bent path. This also contributes to the separation of foreign matters from the air flow before the air flow reaches the air inlet 22A, and hence, the prevention of introduction of foreign matters into the upstream side duct module 22. On the other hand, because the upstream side duct module 22 defines the air inlet 22A to face in the forward direction and the intake passage (air passage) to extend rearward from the air inlet 22A, the flow path of the intake air is not sharply bent, and thus, the flow resistance to the intake air is minimized. The horn 60 serving as a flow obstructing member for obstructing the straight air flow from the upper vehicle body opening 6 to the air inlet 22A may be placed in the wide space 12 between the upper vehicle body opening 6 and the air inlet 22A, and thus, can be positioned so as not to significantly affect the amount of air admitted in the air inlet 22A. Further, the presence of a certain distance defined between the upper vehicle body opening 6 and the air inlet 22A in the fore and aft direction contributes to ensuring an adequate amount of air supplied from the upper vehicle body opening 6 to the air inlet 22A. Also, the air flowing along the horn 60 provides a cooling effect to the horn 60 that may rise in temperature during operation.

The horn 60 is required to be placed in a front part of the engine room for effective transmission of the alarm sound. In the illustrated embodiment, the horn 60 is positioned so as to control the pattern of the air flow flowing from the upper vehicle body opening 6 to the air inlet 22A, instead of using a dedicated member for controlling the pattern of the air flow. In other words, the horn 60 serves the dual purposes of providing an auditory warning and regulating the air flow.

Because the horn 60 is thus positioned so as to oppose the upper vehicle body opening 6, the sound emitted from the horn 60 can be transmitted to the area located ahead of the vehicle without being significantly obstructed by a part of the vehicle body 2.

Because the space 12 defined between the radiator 11 located in a front part of the engine room 3 and the upper vehicle body opening 6 is covered by the cover member 10 from above, the external appearance of the engine room 3 can be improved. Also, the recess 50 opening out toward the rear and defining the opening 50E in the front part thereof is formed in the cover member 10, and the upstream side duct module 22 is received in this recess 50. Therefore, the external air admitted into the engine room 3 from the upper vehicle body opening 6 is forwarded into the upstream side duct module 22 received in the recess 50 defined on the upper side of the cover member 10 via the opening 50E. As a result, the heated air that may be present above the cover member 10 is prevented from being drawn into the upstream side duct module 22, and the upstream side duct module 22 is prevented from protruding excessively upward from the cover member 10.

The upstream side duct module 22 is received in the recess 50 in such a manner that the air inlet 22A of the upstream side duct module 22 is spaced from the front wall 50B of the recess 50, and the opening 50E is defined by the slots 51 formed in the front wall 50B and a front part of the bottom wall 50A. Therefore, the opening 50E can allow the air to be drawn into the air inlet 22A with minimum flow resistance, while preventing any large foreign objects to be drawn into the air inlet 22A.

As shown in FIGS. 3 to 5, the upstream side duct module 22 is provided with a relatively large flange 37 extending beyond the outer profile of the recess 50 so that the heated air that may be present above the cover member 10 is prevented from being drawn into the air inlet 22A in an even more reliable manner.

During the operation of the engine 13, the radiator 11 and the engine 13 (in particular, the exhaust system thereof) located behind the radiator 11 emit a large amount of heat. In the illustrated embodiment, as shown in FIG. 1, the upstream side duct module 22 is offset to the left relative to the center of the radiator 11 (or the center of the vehicle body 2). And, as shown in FIGS. 4, 6 and 7, the partition wall 66B extending in the fore and aft direction is provided in front of and on the right hand side of the opening 50E (namely, the partition wall 60B is offset relative to the lateral center of the opening 50E in an inboard direction). Therefore, the partition wall 66B prevents the air heated by the engine 13 and the radiator 11 from flowing into the opening 50E.

The present invention has been described in terms of a preferred embodiment thereof, but is not limited by the illustrated embodiment, and can be modified and substituted in various ways without departing from the spirit of the present invention. For instance, the upstream side duct module 22 was provided on the left hand side of the vehicle body 2 in the illustrated embodiment, but may also be provided on the right hand side of the vehicle body 2. In such a case, the entire arrangement may consist of a mirror image of the illustrated embodiment. Also, the partition wall 66B was formed as an integral part of the flow guide member 66 which is in turn attached to the support member 65, but the partition wall 66B may also be integrally formed with the support member 65.

The invention claimed is:

1. An engine intake structure for an internal combustion engine of a vehicle, comprising:
   a vehicle body opening formed in a front part of an engine room of the vehicle;
   an intake duct member defining an air inlet facing in a forward direction and an air passage extending rearward from the air inlet, the air inlet being positioned higher than the vehicle body opening; and
   a flow obstructing member positioned in a straight path extending from the vehicle body opening to the air inlet,
   wherein the flow obstructing member comprises an auxiliary device of the vehicle, and the auxiliary device comprises a horn.

2. The engine intake structure according to claim 1, further comprising a radiator provided in a front part of the engine room, and a cover member covering an upper part of a space defined between the vehicle body opening and the radiator, wherein the cover member is formed with a downward recess which is open in a rear end thereof and has an opening passed through the cover member in a front end thereof, and the intake duct member is at least partly received in the recess.

3. The engine intake structure according to claim 2, wherein the recess is provided with a bottom wall and a front wall, and the air inlet is spaced rearward from the front wall, and the opening comprises a plurality of slots formed in the front wall and a front part of the bottom wall.

4. The engine intake structure according to claim 3, wherein each slot extends vertically in the front wall, and continuously extends to the front part of the bottom wall.

5. The engine intake structure according to claim 4, wherein the intake duct member is provided with a flange extending laterally beyond an outer periphery of the recess and closely overlying the cover member.

6. The engine intake structure according to claim 2, wherein the recess is formed in a part of the cover member which is laterally offset relative to a lateral center of the radiator, and the engine intake structure further comprises a partition wall extending vertically and in a fore and aft direction, and located in front of the recess in an offset relationship to a lateral center of the opening in an inboard direction.

7. An engine intake structure for an internal combustion engine of a vehicle, comprising:
   a vehicle body opening formed in a front part of an engine room of the vehicle;
   an intake duct member defining an air inlet facing in a forward direction and an air passage extending rearward from the air inlet, the air inlet being positioned higher than the vehicle body opening;
   a flow obstructing member positioned in a straight path extending from the vehicle body opening to the air inlet;
   a radiator provided in a front part of the engine room, and a cover member covering an upper part of a space defined between the vehicle body opening and the radiator, wherein the cover member is formed with a downward recess which is open in a rear end thereof and has an opening passed through the cover member in a front end thereof, and the intake duct member is at least partly received in the recess; and an upper flow guide plate extending substantially horizontally in the space defined between the vehicle body opening and the radiator in an overlapping relationship with the flow obstructing member in side view.

8. The engine intake structure according to claim 7, further comprising a lower flow guide plate extending substantially horizontally under the upper flow guide plate in a spaced apart relationship, and an active grill shutter provided to oppose a front side of the radiator, wherein the active grill shutter includes a frame member extending along an outer periphery of the active grill shutter, and the upper flow guide plate and the lower flow guide plate are supported by an upper lateral member and a lower lateral member of the frame member, respectively.

9. The engine intake structure according to claim 7, wherein the recess is formed in a part of the cover member which is laterally offset relative to a lateral center of the radiator, and the engine intake structure further comprises a partition wall extending vertically and in a fore and aft direction, and located in front of the recess in an offset relationship to a lateral center of the opening in an inboard direction.

* * * * *